United States Patent Office 2,731,450
Patented Jan. 17, 1956

2,731,450

THERMOSETTING RESINS

George E. Serniuk, Roselle, and Lester Marshall Welch, Madison, N. J., assignors to Esso Research and Engineering Company, a corporation of Delaware No Drawing. Application November 1, 1951, Serial No. 254,444

1 Claim. (Cl. 260—80.7)

This invention relates to resinous low temperature interpolymers of divinyl aromatics, such as benzene, naphthalene, etc., with an olefin or with a multiolefin, and relates particularly to novel compositions having thermosetting properties which are prepared by the copolymerization of divinyl benzene with an olefin or with a conjugated diolefin.

It has been found possible to produce valuable and novel compositions by the low temperature polymerization of divinyl benzene together with an olefin or multiolefin in the presence of a Friedel-Crafts catalyst and at temperatures of −70° to +50° C. These polymerization products are resins possessing thermosetting properties and are generally soluble in hydrocarbon solvents, linseed oil and similar vehicles in proportions sufficient to yield valuable varnish, paint or enamel compositions. The resins prepared according to this invention show heatbodying properties which render them particularly valuable in the preparation of varnishes, coatings, printing inks, and other similar type products. These resins could also be compounded with such things as wood flour, asbestos, sawdust, etc. and used as molding compositions.

The herein referred to resinous products by themselves can be preformed in a mold and inverted into a hard, hydrocarbon insoluble mass by the application of moderate heat and pressure. These polymerization products, when cast into a film from solutions, form a hard, durable surface upon exposure of the film to infra-red heat or to the action of amine-boron trifluoride complexes.

The olefin-containing material used to obtain the polymers of the present invention is a mixture of a divinyl aromatic compound and at least one other polymerizable reactant having carbon-carbon unsaturation.

The divinyl aromatic compound can be any aromatic hydrocarbon having two unsaturated linkages of the divinyl type. The preferred agent is divinyl benzene, although alkyl-substituted divinyl benzene, diisopropenyl benzene, and the divinyl naphthalenes are also usable.

The second reactant may be selected from the olefin classes including those of the primary, secondary, and tertiary types, straight or branched chain as well as cyclic or bicyclic olefinic compounds. Examples of olefins which can be used are propylene, isobutylene, 1-butene, 2-butene, 2-methyl-1-butene, 2-methyl-2-butene, diisobutylene, 2-ethyl-1-hexene, 2-ethyl-1-butene, cyclohexene, 1-vinyl-3-cyclohexene, limonene, dipentene, propenyl benzene, alpha-methyl propenyl benzene, camphene, carvomenthene, styrene, and substituted styrenes.

These unsaturated compounds include olefins having between 3 and 14 carbon atoms per molecule. Alternatively, the second component may be a multi-olefin, and the diolefins, particularly the conjugated diolefins, are the preferred reactants. The diolefinic compounds which may be used include butadiene, isoprene, piperylene, dimethylbutadiene, chloroprene, cyclopentadiene, methyl cyclopentadiene, and the methyl pentadienes. The conjugated diolefins having from 4 to 8 carbon atoms are particularly useful.

A three component system may also be employed using divinyl benzene, a monoolefin, and a diolefin as, for instance, a mixture of divinyl benzene, butadiene, and diisobutylene in appropriate proportions.

The percentages of the olefinic reactants may be varied. The useful concentrations for the olefin reactants in a two component system range from 40 to 95 parts by weight of the diolefin together with from 60 to 5 parts by weight of the divinyl aromatic component. Approximately equal proportions of divinyl benzene together with the other olefinic component yields a preferred resin composition. The useful ranges in a three component system are from about 0.4% up to about 6% divinyl aromatic reactant with from 40% up to about 95% diolefin and the remainder a monoolefin, preferably of the branched chain class. Preferred limits of specific components are about 54.8 parts of butadiene, 44.8 parts of diisobutylene, and 0.4 parts of divinyl benzene to about 52 parts of butadiene, 42 parts of diisobutylene and 6 parts of divinyl benzene.

The reactant mixture may be subjected to polymerization at temperatures of from −70° to +50° C., preferably the temperature is maintained within the range between room temperature and −40° C. Any necessary cooling may be obtained by the use of a refrigerating jacket upon the reactor, or by the addition of limited amounts of low boiling, inert refrigerant such as propane, ethane, or an alkyl halide such as methyl chloride, ethyl chloride, and the various fluorine substituted hydrocarbons known as "Freons."

The polymerization is conducted by adding to the rapidly agitated olefinic mixture a dissolved Friedel-Crafts catalyst. It is very necessary that the catalyst employed be substantially completely in solution in order to obtain the proper and constant activity of the catalyst, thereby maintaining a satisfactory reaction rate and eventually reaching the proper conversion level of the monomers.

The Friedel-Crafts catalysts which can be used to carry out the copolymerization reaction include aluminum chloride, aluminum bromide, titanium tetrachloride, boron fluoride, or complexes thereof, with organic compounds such as certain organic ethers. Ether complexes which may be prepared and which are particularly useful are the Friedel-Crafts complexes of $\beta,\beta'$-dichloroethyl ether, diphenyl ether, and anisole. The preferred catalyst substance is aluminum chloride although other aluminum halides such as aluminum chlorobromide or double salts such as that of aluminum chloride and aluminum alkoxide may be used.

For the catalyst solvent, the preferred solvents for use with aluminum chloride are ethyl and methyl chloride, or carbon disulfide, or ethylene dichloride, or other low molecular weight halogen-containing compounds having less than 5 carbon atoms per molecule and 1 or more halogen substituents. It is only necessary that the freezing point of the catalyst solvent be such that it will remain as a liquid at the chosen polymerization temperature. For the aluminum bromide or aluminum chlorobromide, the low molecular weight hydrocarbons such as butane and the pentanes are satisfactory catalyst solvents. With boron trifluoride, ethylidene difluoride and various other fluorinated compounds are the preferred solvents. It is preferred to employ a catalyst solution having from 0.1% up to 5% of the active catalyst dissolved in the solvent.

The polymerization may be carried out by addition of the catalyst solution to the mixture of olefinic reactants, or the reaction may be carried out in the presence of inert diluent. It is only necessary that the diluent not form a stable complex with the catalyst, that it be essentially inert and non-reactive under the conditions of the polymerization, and that it remain a liquid at the polymerization temperature employed. If desired, the same liquid employed as a catalyst solvent may also, in most cases, be employed as the reaction diluent. However, other liquids having the appropriate properties may also be used. Useful diluents include methyl chloride, ethyl chloride, carbon disulfide, and fluorinated hydrocarbons.

The catalyst solution may be added to the polymerization mixture in the form of a fine spray onto the surface of the rapidly stirred solution or olefinic materials. Another manner in which the catalyst solution may be introduced into the reaction mixture is in the form of a fine jet under substantial pressure directly into the mass of the stirred solution of the olefinic materials. The catalyst efficiency preferred is 10 to 80 grams of resin per gram of catalyst.

The catalyst solution should be added in such a manner that the polymerization proceeds at good speed, and generally, this requires that the catalyst be added over a period of from a number of minutes to several hours depending upon the size of the batch and other handling arrangements. It is contemplated that the novel compositions of this invention can be prepared either by batch or continuous reaction. The general operating conditions and process steps employed in preparing other thermosetting resins are likewise applicable to the preparation of the resins of the invention. Special care is required in temperature control during recovery because of the relatively high reactivity of the resin.

The polymerization is continued until from 30 to 90% of the olefinic reactants are polymerized. When the desired conversion level is reached, the catalyst is promptly inactivated by the adding of an appropriate amount of a catalyst deactivator such as methyl or isopropyl alcohol diluted with a volume of the diluent used in the reaction. The deactivated mixture is discharged from the reactor into suitable finishing apparatus such as a tank of warm naphtha or hot water or warm linseed oil, or the like. The polymer dissolves promptly in naphtha or an aromatic solvent such as benzene and refrigerant, low boiling solvents, and any unpolymerized olefinic materials are quickly volatilized, leaving the resin polymer in solution in the light naphtha or benzene. The resin solution may be filtered free of catalyst residues after treatment with clay, or the solution may be washed with water to remove the residual catalyst. The resin may then be separated in any convenient way such as by flashing out the solvent or by precipitation of the resin by the addition of appropriate amounts of an alcohol such as ethyl alcohol, or isopropyl alcohol, or the like. In warm water, the polymer forms a slurry and all the volatiles can be boiled out, and in addition, a portion of the catalyst is washed out. Similarly, in warm linseed oil the polymer dissolves completely with the volatilization of the above-mentioned extraneous materials. In linseed oil likewise the catalyst can be removed by washing with warm water or by a very mild alkali solution.

The invention will be more specifically illustrated by the following examples, although it is not intended to limit the invention in any way thereto since the examples represent only two of the possible embodiments of the invention.

*Example I.—(Butadiene/divinyl benzene; 69/31)*

A reactor was charged with 100 grams of methyl chloride, 17.5 grams of butadiene and 20 grams of a 40% solution of divinyl benzene containing also p-ethyl styrene and ethyl benzene. To this was added 18 cc. of β,β'-dichloroethyl ether. AlCl₃, dissolved in ethyl chloride, 2.8 grams AlCl₃/100 cc. of solution, was added slowly to the olefinic mixture. After adding 70 cc. of catalyst solution, the desired conversion to polymer was reached. The catalyst was quenched with isopropyl alcohol. This solution was then poured into a large volume of alcohol, thereby causing the resin to precipitate. The recovered resin was brittle and light in color. This resin, when placed in a mold and heated for a short time at 150° C., formed an insoluble infusible mass.

*Example II.—(Isobutylene/divinyl benzene; 67/33)*

In this experiment, there was used 100 grams of methyl chloride, 32.5 grams of isobutylene and 40 grams of 40% divinylbenzene solution. To this mixture was added 18 cc. of β,β' dichlorethyl ether. The catalyst described above was then added. After the polymer was formed, the catalyst was quenched with isopropyl alcohol. The solution was then added to a large volume of alcohol, whereupon a large amount of light colored soluble polymer separated. This polymer showed thermosetting properties.

*Example III.—(Butadiene/diisobutylene/divinyl benzene; 55/45/0)*

A reactor flask, fitted with a stirrer, a Dry-Ice-alcohol refrigerated reflux condenser, a catalyst injection funnel and a thermometer, was charged with 552 grams of methyl chloride, 414 grams of 1,3-butadiene, and 338 grams of pre-cooled diisobutylene, and the mixture stirred until an equilibrium temperature of −14° C. was reached. To the mixture, over a period of about 47 minutes, was added 200 cc. of a catalyst solution consisting of 3.64 grams of anhydrous AlCl₃/100 cc. of ethyl chloride. The catalyst was then quenched by means of isopropyl alcohol (75 cc.), added slowly over a period of several minutes. The reaction mixture was diluted with 500 cc. of 54° naphtha, and the solution allowed to stand overnight during which time the methyl and ethyl chlorides were weathered off. The remaining resin solution was freed of catalyst residues by washing with water. The solvents were stripped from the resin by heating to 460° F. There were obtained 523 grams, representing a yield of 70%, of a light colored, hard, resin having a Wijs iodine number of 110. The catalyst efficiency was 72 (grams polymer/grams catalyst). This product, made from a reaction mixture containing no divinyl aromatic compounds, was not thermosetting under conditions normally employed for molding articles.

*Example IV.—(Butadiene/diisobutylene/divinyl benzene; 54.8/44.8/0.4)*

The reaction equipment described in Example III was charged with 552 grams of methyl chloride, 414 grams of 1,3-butadiene, 338 grams of diisobutylene, and 7.5 grams of 40% divinylbenzene, and the mixture stirred until an equilibrium temperature of −15.5° C. was attained. To the well agitated mixture, there was then added a total of 300 cc. of a catalyst solution comprising 2.8 grams of anhydrous AlCl₃/100 cc. of ethyl chloride, in increments, during the course of 82 minutes. The catalyst was quenched with 75 cc. of isopropyl alcohol. The product was isolated in the manner described under Example III. There were obtained 553 grams, representing a yield of 72%, of a light colored resin possessing a softening point (Ring & Ball) of 80.5° C. and having a Wijs iodine number of 120. The catalyst efficiency was about 66 (grams polymer/grams catalyst).

*Example V*

The resin of Example IV was formulated into a linseed oil varnish (15 gallon oil length) and air dried and baked films thereof were evaluated for their properties. A varnish of V–W Gardner viscosity was obtained after a cook time of 4 hours and 25 minutes at 565° F. The varnish possessed a Gardner color of 10 to 11. The air dried and baked films exhibited properties as shown in Table I below:

TABLE I

| Test | Air Dried Film | Baked Film |
|---|---|---|
| Hardness | 0 | 0 |
| Water Resistance | 7 | 0 |
| Grease Resistance | 8 | 8 |
| Alkali Resistance | 7 | 3 |
| Soap Resistance | 7 | 3 |
| Flexibility | 0 | 0 |

Key to evaluation ratings

Hardness:
  0—Very hard
  9—Soft
Flexibility (180° bend test):
  0—Unaffected
  1-4—Hazed and less adhesion
  5-6—Very fine cracking
  7-9—Heavy cracking and peeling
Water, grease, alkali and soap resistance:
  0—Unaffected
  1-3—Discolored or whitened and less adhesion
  4-6—Softened and loss in adhesion
  7-9—Pinholed or blistered to failure by removal of the film

*Example VI.—(Butadiene/diisobutylene/divinyl benzene; 54/44/2)*

The apparatus described in Example III was charged with 552 grams of methyl chloride, 414 grams of 1,3-butadiene, 338 grams of diisobutylene, and 37.5 grams of 40% divinyl benzene, and the mixture stirred until an equilibrium temperature of —16° C. was attained. To the above was then added a catalyst solution consisting of 2.8 grams of anhydrous $AlCl_3$/100 cc. of ethyl chloride. A total of 290 cc. of the above described catalyst solution was added in an incremental manner during the course of 64 minutes. The quenching of the catalyst and the isolation of the product was carried out by the procedure set forth in Example IV. There was obtained 600 grams of resinous product which represents a yield of 78%, and a catalyst efficiency of 74. The iodine number of the product was 128. The softening point of this product could not be obtained as the product became thermally set before complete softening occurred because of the heat applied during the test. Upon injecting the powdered resin into a mold and applying moderate heat and pressure a hard, insoluble, infusible product was formed.

*Example VII*

The resin of Example VI was converted to a linseed oil varnish (15 gallon oil length) of U-V Gardner viscosity after a cook time of 2 hours and 45 minutes at 565° F. The varnish possessed a color (Gardner) of 8–9, and a reduced cure of 15 seconds. Air dried and baked films of this varnish showed the characteristics set out in Table II below.

TABLE II

| Test | Air Dried Film | Baked Film |
|---|---|---|
| Hardness | 0 | 0 |
| Water Resistance | 0 | 0 |
| Grease Resistance | 8 | 8 |
| Alkali Resistance | 7 | 4 |
| Soap Resistance | 8 | 6 |
| Flexibility | 0 | 0 |

It will be noted that the 2% divinyl benzene in the feed greatly reduced the cook time required to reach the proper viscosity in the varnish. Also, the water resistance of the air-dried films made from this varnish was greatly improved.

*Example VIII.—(Butadiene/diisobutylene/divinyl benzene; 52.8/43.4/3.8)*

A mixture of 414 grams of 1,3-butadiene, 338 grams of diisobutylene, and 75 grams of 40% divinyl benzene, in 552 grams of methyl chloride diluent, was reacted at —11 to —14° C. over a period of 70 minutes in the presence of 250 cc. of incrementally added aluminum chloride-ethyl chloride catalyst containing 2.48 grams of $AlCl_3$/100 cc. of ethyl chloride. After working up the product in a manner described in Example IV, there were obtained 480 grams, or 61% yield, at a catalyst efficiency of 77, of a resinous product which showed thermosetting properties. Attempts to formulate a linseed oil varnish (15 gallon oil length) at 565° F. from this resin resulted in the formation of a gel after a short time of heating. The gel formed before the cook temperature of 565° F. was reached. The solid resin, upon molding at moderate temperature and pressure, produced an insoluble, infusible mass.

*Example IX.—(Butadiene/diisobutylene/divinyl benzene; 51.9/42.5/5.6)*

The reaction described in Example VIII was repeated with the exception that 112.5 grams of 40% divinyl benzene was used. A total of 300 cc. of $AlCl_3$/ethyl chloride catalyst solution, containing 2.16 grams of $AlCl_3$/100 cc. of ethyl chloride, was added incrementally over a period of 90 minutes. After working up the product according to the procedure of Example IV, there were obtained 420 grams, corresponding to a 53% yield at a catalyst efficiency of 65, of a resinous product possessing thermosetting properties. Attempts to formulate a 15 gallon oil length linseed oil varnish at 565° F. from this product were unsuccessful. The mixture gelled before the required cooking temperature of 565° F. was reached.

What is claimed is:

A thermosetting tripolymer resin prepared by copolymerizing a mixture of from 0.4 to 6 parts of divinyl benzene, from 54.8 to 52 parts of butadiene, and from 44.8 to 42 parts of diisobutylene with a dissolved Friedel-Crafts catalyst at a temperature of —70° to +50° C.

References Cited in the file of this patent

UNITED STATES PATENTS

| | | |
|---|---|---|
| 2,089,444 | Staudinger et al. | Aug. 10, 1937 |
| 2,213,423 | Wiezevich | Sept. 3, 1940 |
| 2,274,749 | Smyers | Mar. 3, 1942 |
| 2,368,538 | Gleason et al. | Jan. 30, 1945 |
| 2,510,647 | Miller et al. | June 6, 1950 |
| 2,559,062 | Dornte | July 3, 1951 |
| 2,609,363 | Welch | Sept. 2, 1952 |
| 2,626,940 | Sparks et al. | Jan. 27, 1953 |
| 2,671,774 | McCracken et al. | Mar. 9, 1954 |